Oct. 26, 1971 M. T. HENRY 3,614,806
METHOD FOR SHUCKING SHELLFISH
Filed Feb. 18, 1969
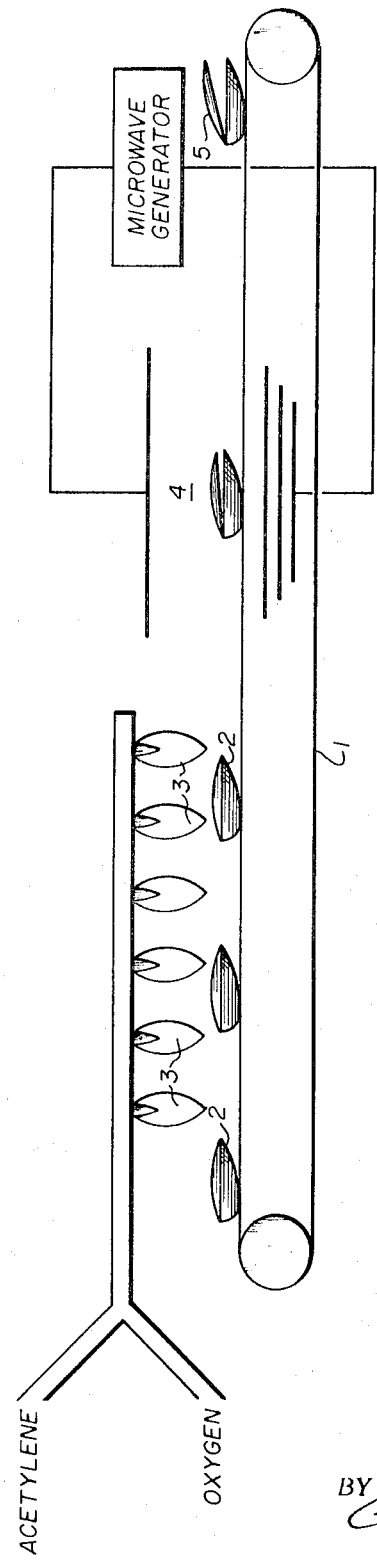
INVENTOR.
MICHAEL T. HENRY
BY
ATTORNEY

United States Patent Office 3,614,806
Patented Oct. 26, 1971

3,614,806
METHOD FOR SHUCKING SHELLFISH
Michael T. Henry, Roseland, N.J., assignor to
Interchemical Corporation, New York, N.Y.
Filed Feb. 18, 1969, Ser. No. 800,194
Int. Cl. A22c *29/00*
U.S. Cl. 17—48                                13 Claims

ABSTRACT OF THE DISCLOSURE

A method for shucking shellfish, particularly oysters, by exposing them to microwaves and oxy-acetylene heat for a period of time sufficient to open the shellfish and detach it from the shell.

BACKGROUND OF THE INVENTION

Field of the invention

This application relates to a method for opening the shells of shellfish and detaching the shellfish from attachment to the shells.

Description of the prior art

It is extremely old and well known to open shellfish such as oysters by hand by the use of an oyster knife or similar implement. However, this method is slow, unsanitary and has a potential for injury to the person opening the sellfish because of the difficulty of opening the shell, the dexterity required, and the sharp implement used. Furthermore, because of the labor involved and the time consumed, this method is expensive. Also, persons with the skill required to do this work by hand are rapidly disappearing from the scene either because of age or because of change to more desirable occupations.

Other methods have been tried to eliminate the need for opening shellfish by hand. However, for various reasons detailed below, these methods have not been satisfactory and thus have not been widely employed.

For example, it is known to use an electric field to open scallops. However, I have found that the methods employed on scallops are unsatisfactory for use on other shellfish. For example, I have found that such methods will not open oysters. Furthermore, when such methods are employed on oysters, I have found that the oysters cook in their shells rather than opening, thus rendering them totally unsuitable for the highest paying markets for oysters, i.e. oysters on the half shell and other raw forms of oysters.

It is also known to open oysters by the use of microwaves. However, this method has the disadvantage that the oysters, after opening, must still be cut from their shells with a knife or separated by other means.

It is also known to detach shellfish from their shells by the use of heat or flame, but all such known methods have the disadvantage that they cook the shellfish to a greater or lesser extent. Furthermore, these processes require rather elaborate equipment and some require an additional step of removal of the liquid from the shell before heat treatment to detach the shellfish from the shell.

SUMMARY OF THE INVENTION

I have developed a novel, fast, inexpensive method for opening oysters and other shellfish and detaching them from their shells. This method requires little hand labor and reduces the skill of the labor required when compared with past methods. It presents little or no potential for injury to the laborer. Furthermore, and most important, the product obtained from my process is an unheated, uncooked, raw oyster, on the half shell if desired, and is thus saleable on the highest priced market for oysters.

Broadly my process comprises the steps of:
(1) Exposing shellfish such as oysters to oxy-acetylene heat for a short period of time to detach the shellfish from its shell, and
(2) Exposing the oysters or other shellfish to microwaves for a short period of time in order to open the shell.

These steps need not necessarily be carried out in this order and can even be done concurrently, although the above sequence is preferred.

BRIEF DESCRIPTION OF THE DRAWING

My invention will be more particularly described by reference to the attached drawing.

Reference numeral 1 indicates a conveyor upon which shellfish, in this case oysters 2, have been placed. The oysters are preferably positioned with their flatter shells up so that when they are opened liquid will be retained in the more concave shell. The conveyor 1 moves the oysters 2 beneath the tips of oxy-acetylene flames 3 from conventional oxy-acetylene torches. This flame treatment causes the oysters to detach from their flatter shell. If detachment from both shells is desired, both shells may be flame treated. After the flame treatment the detached oysters are passed through a microwave field 4 from a conventional microwave oven, thus causing the oysters to open. Their upper shells 5 may then be removed simply by lifting them off with a slight twist.

DESCRIPTION OF THE PREFERRED EMBODIMENT

I have found that it does not matter in what order the steps of my process are carried out. For example, the microwave exposure can be effected before or after oxy-acetylene heat exposure or both exposures can be conducted at once.

A conventional microwave oven is employed in order to cause the oysters to open. Such ovens normally operate on the FCC assigned frequencies of either about 915 or 2450 megacycles on a power of from about 1 to 50 kilowatts. However, frequency is not critical to my invention as long as the frequency is in the microwave range and is sufficient to cause the shellfish to open in a short period of time without cooking. The period of exposure required to cause the oysters to open will vary with the frequency and power employed. However, I have found that a period in the range from about 20 to about 30 seconds at 2450 megacycles at a power of 2 kw. will effect opening of oysters at rates of 18–24 oysters per minute. As a rough rule of thumb for estimating power requirements, about 30 oysters per minute per kilowatt can be opened.

Frequencies outside the microwave range were employed with oysters but were not effective to open the oysters. For example, a frequency of 97 megacycles was tried on oysters for a similar period of time and it was found that no opened oysters were obtained and that the oysters just sat and cooked in their shells, thus rendering them unsuitable for the many markets for raw oysters. Although both 915 and 2450 megacycles are suitable, the higher frequency is preferred since it is easier to maintain a cool oyster at the higher frequencies.

With reference to the oxy-acetylene heat employed by my process, temperatures in the range of about 3000° to about 6300° F. can be employed. I have found that temperatures of about 3000° to about 4000° are particularly suitable. Such a temperature can be obtained by adjusting the oxy-acetylene torch to feed about 12 pounds of acetylene per 20 pounds of oxygen. Although my invention is herein described by reference to oxy-acetylene heat, this term is meant to also encompassing other types of heat in the same temperature range or above. I have also found that a laser is a suitable substitute for oxy-acetylene heat, the laser beam being directed upon the shells in the same manner as the flame. Any conventional gas laser such as $CO_2$, He or $N_2$ can be used. Such lasers normally operate on about 100 watts of power and on a wavelength of about 10.6 microns. The $CO_2$ laser is preferred.

Only a very short exposure of the oysters to these high temperatures is necessary. I have found that an exposure time in the range from about 5 to about 10 seconds, preferably from about 5 to about 8 seconds, is suitable. Thicker shelled oysters or other shellfish require the slightly longer exposure times.

I have found that the oysters emerging from oxy-acetylene treatment are not cooked and are in fact cool to the touch. Although I do not wish to be limited to this theory of operation, it is thought that the oyster is caused to separate from its shell not by heating of the muscles, as in prior art processes, but rather by the sudden temperature shock of sudden exposure to these very high temperatures, much as a man would instinctively remove his hand from a hot surface without it having been there long enough to be burned or significantly heated.

I have found that use of lower temperatures than those I have specified, such as those obtained from a propane torch, are unsuitable for detaching the shellfish, since they do not result in a cool oyster but rather in one which has been cooked to a detectable extent.

Employment of my novel process can result in production of quantities of open and detached oysters or other shellfish which would be impossible to achieve due to the shortage of hand labor. Furthermore, my process can achieve cost reductions of 50% or more over hand techniques.

Although my invention has been described particularly with respect to oysters, it will also be effective on other shellfish such as clams, scallops and mussels.

I have furthermore found that my process results in raw shellfish having a slightly reduced bacteria count as compared with raw shellfish produced by conventional methods.

I claim:
1. A process for opening shellfish and detaching them from their shell comprising the steps of
   (a) exposing the shell of the shellfish to heat of a temperature from about 3000° to about 6300° F. for a sufficient period to detach the shellfish from its shell but insufficient to cause cooking and
   (b) exposing the shellfish to microwaves for a period sufficient to cause the shellfish to open but insufficient to cause cooking.
2. The process of claim 1 wherein said shellfish are oysters.
3. The process of claim 1 wherein said shellfish are clams.
4. The process of claim 1 wherein said shellfish are exposed to microwaves for a period in the range of from about 20 to about 30 seconds.
5. The process of claim 1 wherein said shellfish are exposed to heat for a period from about 5 to about 8 seconds and wherein said heat is oxy-acetylene heat.
6. The process of claim 1 wherein exposure to heat precedes the microwave exposure.
7. The process of claim 1 wherein the heat is provided by a laser.
8. A process for detaching shellfish from their shell comprising exposing the shell to heat of a temperature from about 3000° to about 6300° F. for a sufficient period to detach the shellfish from its shell but insufficient to cause cooking.
9. The process of claim 8 wherein the shellfish are oysters.
10. The process of claim 8 wherein the shellfish are clams.
11. The process of claim 8 wherein said heat is oxy-acetylene heat.
12. The process of claim 8 wherein the heat is laser heat.
13. The process of claim 8 wherein said shellfish are exposed to heat for a period of from about 5 to about 8 seconds.

References Cited

UNITED STATES PATENTS

| | | | |
|---|---|---|---|
| 3,070,834 | 1/1963 | Carpenter | 17—48 |
| 3,203,034 | 8/1965 | Matzer et al. | 17—74 |
| 3,230,580 | 1/1966 | Marvin et al. | 17—48 |
| 3,473,191 | 10/1969 | Evans | 17—74 |

LUCIE H. LAUDENSLAGER, Primary Examiner

U.S. Cl. X.R.

17—74